United States Patent [19]

Zambelli

[11] Patent Number: 4,623,239

[45] Date of Patent: Nov. 18, 1986

[54] OPTICAL SCANNING SYSTEM

[75] Inventor: Robert G. Zambelli, Rochester, N.Y.

[73] Assignee: Xerox Corporation, Stamford, Conn.

[21] Appl. No.: 703,781

[22] Filed: Feb. 21, 1985

[51] Int. Cl.$^4$ ............................................. G03G 15/00
[52] U.S. Cl. ............................................. 355/8; 355/11; 355/66; 350/6.5; 350/484
[58] Field of Search .................. 355/8, 14 R, 3 R, 57, 355/60, 66, 11, 55, 56; 350/6.1, 6.5, 484

[56] References Cited

U.S. PATENT DOCUMENTS

| | | | |
|---|---|---|---|
| 3,884,574 | 5/1975 | Doi et al. | 355/55 |
| 3,897,148 | 7/1975 | Ritchie et al. | 355/57 |
| 4,279,497 | 7/1981 | Satomi | 355/11 X |
| 4,330,201 | 5/1982 | Walker | 355/8 X |
| 4,355,883 | 10/1982 | Landa | 355/8 |
| 4,371,254 | 2/1983 | Beery | 355/8 |
| 4,538,903 | 9/1985 | Lane | 355/11 X |
| 4,538,904 | 9/1985 | Lane | 355/57 |

FOREIGN PATENT DOCUMENTS

| | | |
|---|---|---|
| 57-52063 | 3/1982 | Japan . |
| 57-58170 | 4/1982 | Japan . |

OTHER PUBLICATIONS

"Scanning Mirror Imaging System" by W. F. Voit, *IBM Technical Disclosure Bulletin*, vol. No. 9, Feb. 1973, pp. 2691-2692.

*Primary Examiner*—A. C. Prescott

[57] ABSTRACT

A document scanning apparatus is disclosed which provides a scan and rescan motion to a scan carriage using only mechanical drive components. Motion of a rotating photoreceptor is transferred, via drive pulley components to a main drive shaft having, in a first embodiment, a pair of pulleys fixedly mounted at the ends. The pulleys drive cables which, in turn, drive the scan carriages of the disclosed system in a scan or rescan direction, dependent upon the drive pulley rotation. The drive pulley rotation is controlled by a movable hub assembly on a drive shaft and by a linkage mechanism which is periodically engaged by the scan carriage at a beginning or end of scan position. Mechanical engagement of the scan carriage with the linkage mechanism causes a reversal of the drive pulley rotation and hence a reversal of the scan carriage direction of travel. In a second embodiment, a rack and gear arrangement is used to drive the scan carriage.

5 Claims, 7 Drawing Figures

OPTICAL SCANNING SYSTEM

The present invention relates to an optical document scanning system and, in particular, to a scanning system driven in a scan/rescan direction by a mechanical drive arrangement.

Scanning systems employing scan carriages which move parallel to a document platen are well known in the art; two examples being disclosed in U.S. Pat. Nos. 4,407,581 and 4,029,409. For these scan systems, a document is mounted on a stationary transparent platen support and a group of optical components are mounted on one or more cariages mounted beneath the platen support for parallel movement therewith. These optical components typically include an illumination lamp and mirror on a full rate carriage and a mirror on a half rate carriage. As these carriages move at their respective rates, a document on the platen is incrementally scan/illuminated and an image of the document is projected by a lens onto a photosensitive medium, typically a photoreceptor drum or belt.

These prior art scan carriages are driven by a combined mechanical/electrical arrangement wherein motion is imparted to the carriage from a main drive shaft via electrically operated solenoids, pulleys and drive belts. A purely mechanical drive arrangement which does not require the use of electrical components such as switches, relays, solenoids, etc. to initiate start-of-scan or return-to-scan motions is very desirable, both from the standpoint of economy and simplicity.

It is therefore an object of the present invention to provide a drive arrangement for a document scanning system which utilizes solely mechanical components to drive a scanning system in a scan and rescan mode of operation. More particularly, the present invention is directed to a scanning apparatus for reproducing a stationary original document supported on an object surface, the apparatus including optical means for progressively scanning the surface of the original and a lens for receiving the image from said scanning means and for projecting the scanning image onto a moving photosensitive member, the improvement wherein said optical means comprises at least one scanning assembly, adapted to travel along a scan and rescan path parallel to said object surface;

a drive shaft adapted to be driven at a constant velocity by the motion of said photosensitive member, a scanning assembly drive mechanism mechanically coupled to said drive shaft, and to said scanning assembly, said drive mechanism adapted to alternately drive said scanning assembly at a first scan velocity v and at a second rescan velocity v'; and a scanning assembly reversal mechanism operatively positioned between said scanning assembly and said drive mechanism, said reversal mechanism adapted to be periodically engaged by the movement of said scan assembly, such engagement changing the operation of said drive mechanism so as to reverse the direction of travel of said scanning assembly.

DESCRIPTION

Figure 1:
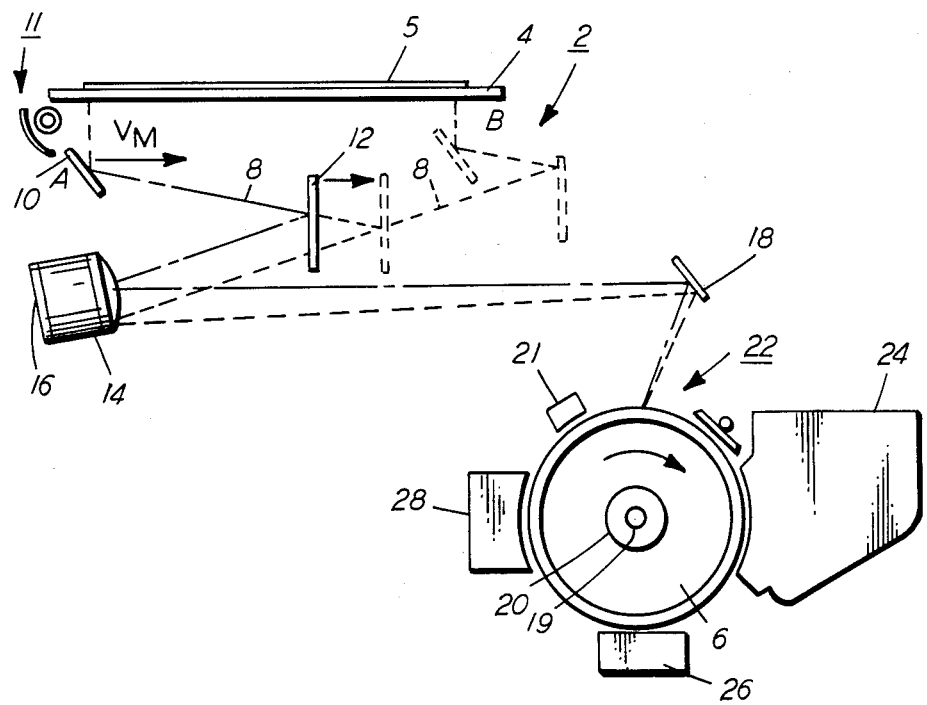
FIG. 1 represents a side schematic view of a document reproduction machine embodying the scanning arrangement of the present invention.
Figure 6:
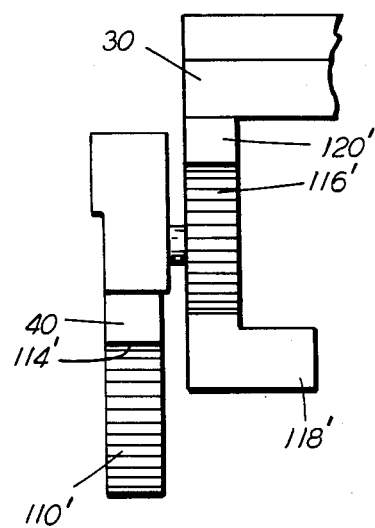
FIG. 6 is an end cross-section view of the gear/rack arrangement of FIGS. 5 and 6.

Referring now to FIG. 1, a folded optical scanning system is represented generally at 2 and includes an object surface or platen 4 having an original document 5 placed thereon, and a photosensitive surface in the form of a photoreceptor drum 6. An optical path 8 extends between object surface 4 and drum 6, and is representative of the path of the principal ray of light between the document and the drum. A first reflector 10, illumination lamp assembly 11, a second reflector 12, a reflector projection lens 14 including a lens reflector 16, and a drum reflector 18 are disposed along the optical path 8. The photoreceptor drum 6 is mounted on shaft 19 which is driven at a constant velocity by a drive motor (not shown). Pulley 20 is fixedly mounted to the outboard end of shaft 19 and rotates therewith for purposes to be described below. Mirrors 10 and 12 are mounted on separate scanning carriages, shown in FIG. 2.

In operation, mirror 10 moves parallel to the object surface 4 through a given displacement and at a given speed $V_m$ as indicated by the arrow. Mirror 12 moves with mirror 10 at half the speed $V_m$ and through a displacement half that of mirror 10. This synchronous movement of mirrors 10 and 12 maintains a constant object conjugate, and a composite image of the incrementally scanned document 5 is reflected from the object surface 4 and projected by lens 14 onto the surface of drum 6. At the end-of-scan position, mirrors 10 and 12, shown in dotted position, are returned to the start-of-scan position, at a rescan velocity v'.

The various processes for producing an output copy of the exposed original document are well known in the art and hence a detailed description is not herein provided. Briefly however, at station 21 an electrostatic charge is placed uniformly over the surface of the rotating drum 6. The charged drum surface is then moved through an exposure station 22, where the flowing light image of the document 5 is imaged on the drum surface. As a result of this imaging operation, the charge on the drum surface is selectively dissipated in the light-exposed region, thereby recording the original input information on the drum surface in the form of a latent electrostatic image. Next, in the direction of drum rotation, the image bearing drum surface is transported through a development station 24 wherein a toner material is applied to the charged surface, thereby rendering the latent electrostatic image visible. The now developed image is brought into contact with a sheet of final support material, such as paper or the like, within a transfer station 26 wherein the toner image is electrostatically attracted from the drum surface to the contacting side of the support sheet. Station 28 represents a mechanism for cleaning toner from the drum surface. A fusing station (not shown) permanently fixes the transferred image on the support sheet. These xerographic stations and their functions are more fully described in U.S. Pat. No. 4,318,610 whose contents are hereby incorporated by reference.

Figure 2:
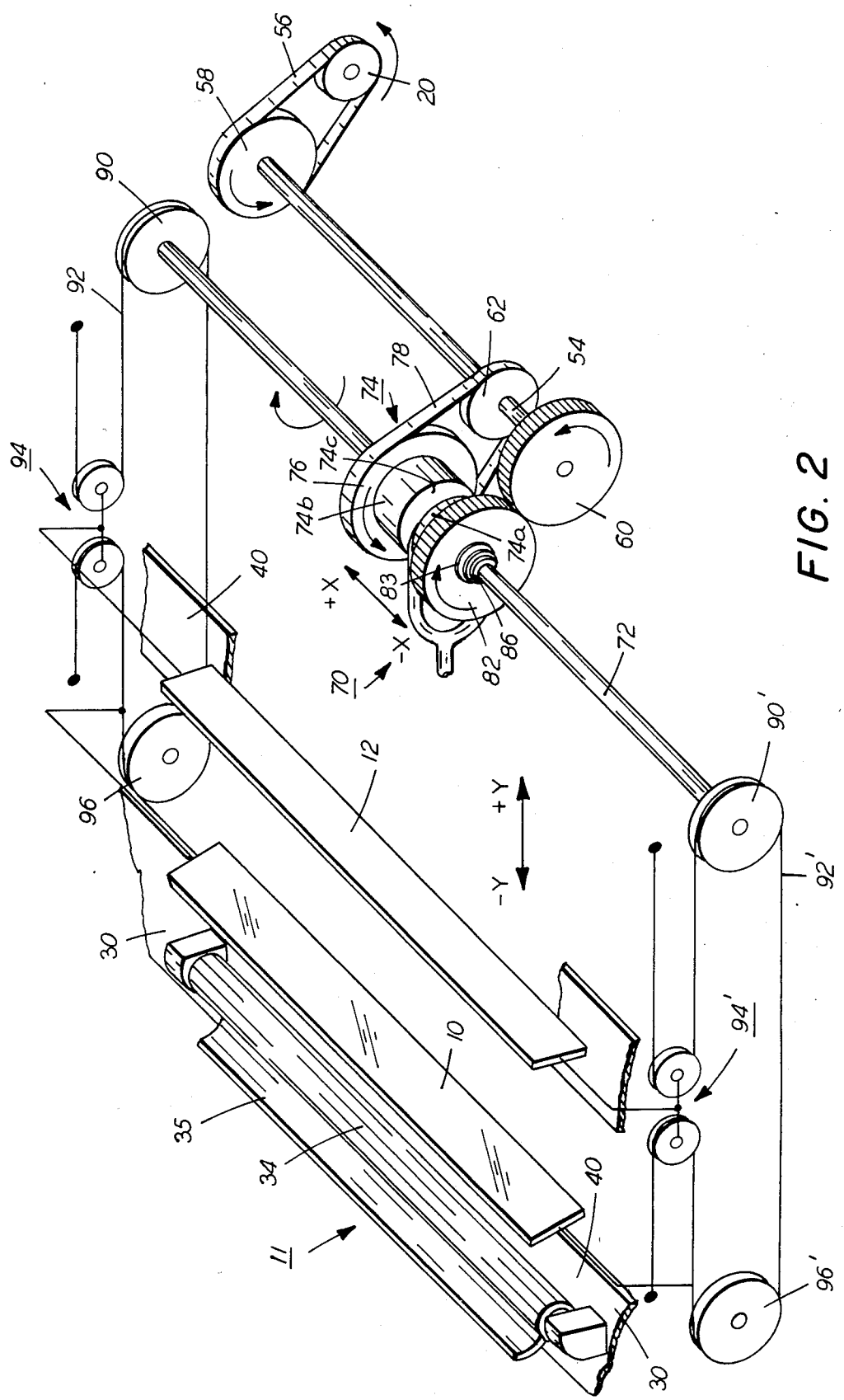
FIG. 2 shows a simplified perspective view of the scanning assembly drive mechanism of FIG. 1.

Referring now to FIG. 2, there is shown a simplified perspective view of the scanning apparatus of FIG. 1 and including the drive arrangement of the present invention. Scanning of the stationary original document 5 is accomplished by means of scanning full rate mirror 10, illumination lamp assembly 11, half rate mirror 12 and stationary reflector projection lens 14. Full rate mirror 10 is supported upon a carriage 30 which is slidably mounted on two parallel aligned guide rails, not shown but conventional in the art. Mirror 10, as positioned upon carriage 30, extends transversely beneath the platen 4 surface and in parallel alignment therewith. Mounted directly behind mirror 10 is illumination assembly 11 consisting of an apertured fluorescent lamp 34 and a reflector 35. These illumination components cooperate to illuminate a longitudinally extending, incremental area upon the platen within the viewing domain of mirror 10. As will be explained in greater detail below, carriage 30 is adapted to move parallel to the lower surface of the platen at a constant rate, whereby mirror 10 scans successive illuminated incremental areas on the platen, beginning at a start-of-scan position (position A in FIG. 1) and ending at the opposite side of the platen (position B in FIG. 1).

A second movable carriage 40 is also provided, upon which is supported half rate mirror 12. Carriage 40 is also slidably mounted on guide rails. Mirror 12 is positioned to receive reflected light rays from scanning mirror 10 and to redirect these light rays into lens 14. Lens 14 projects the document image onto drum 6 via mirror 18 (FIG. 1).

Figure 3:
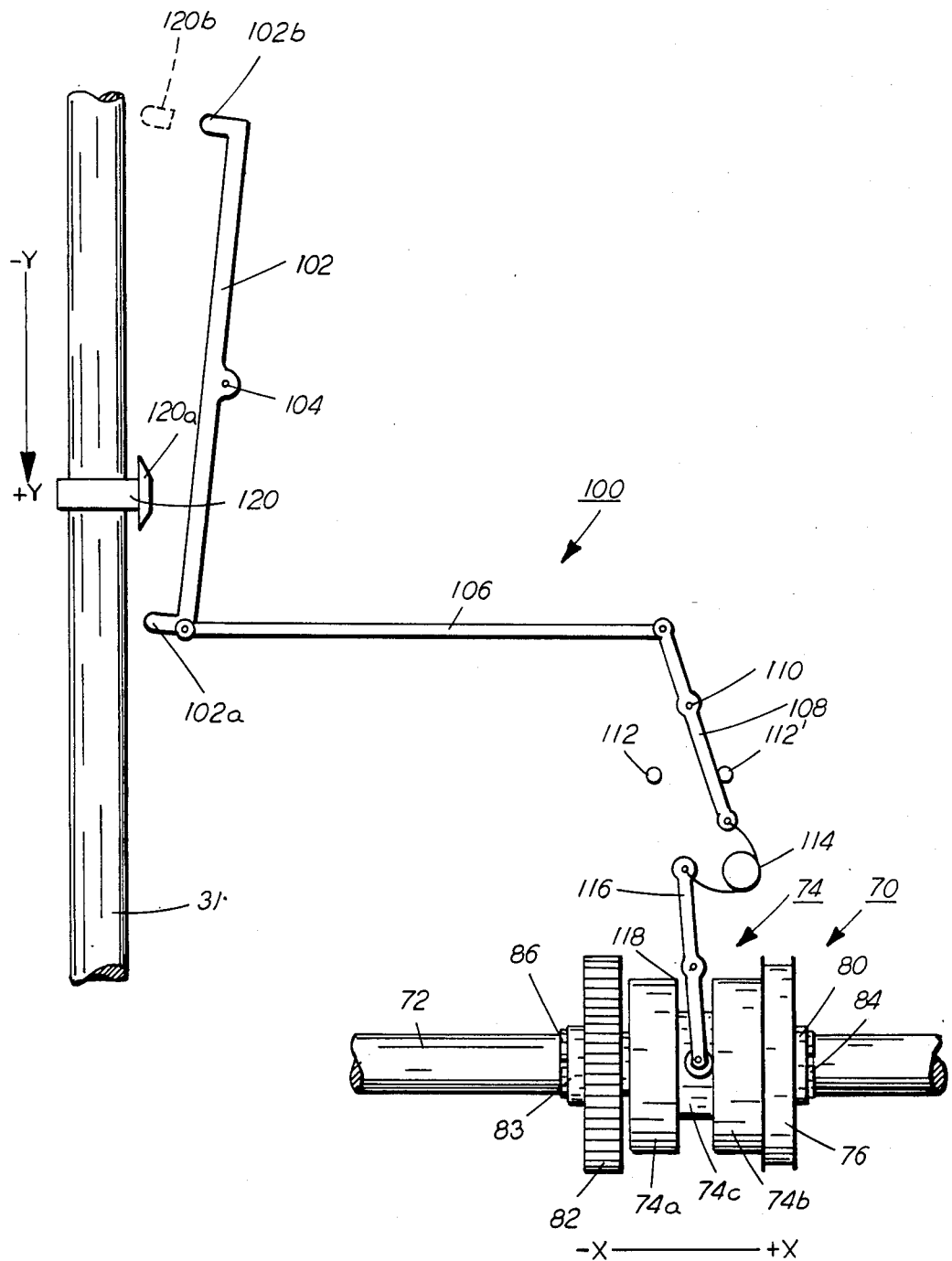
FIG. 3 shows a frontal top view of the scanning assembly drive mechanism and toggle reverse mechanism of FIG. 3.
Figure 4:
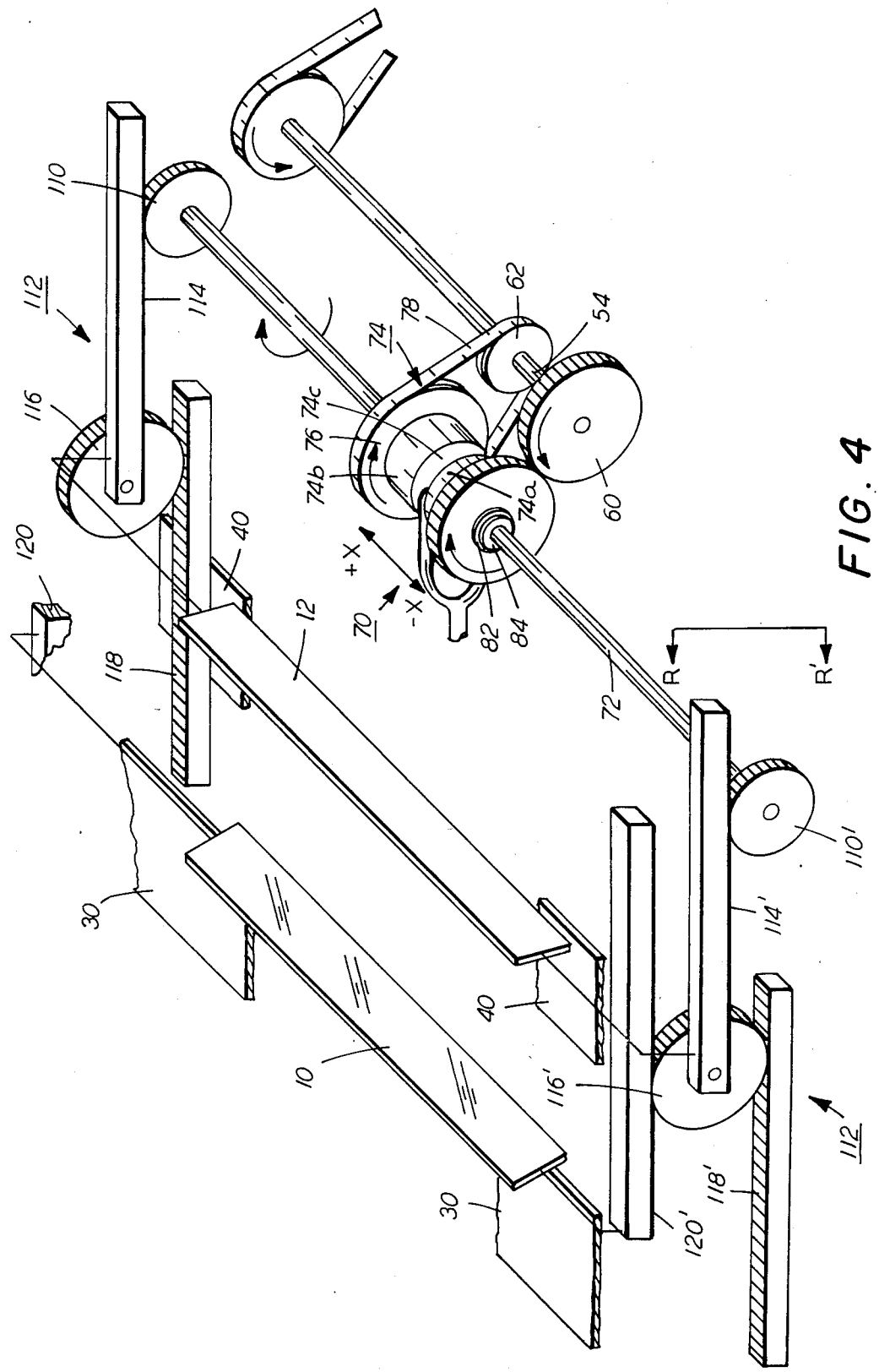
FIG. 4 shows a modification of the FIG. 3 embodiment wherein a gear/rack arrangement drives the scan assembly carriage.
Figure 5:
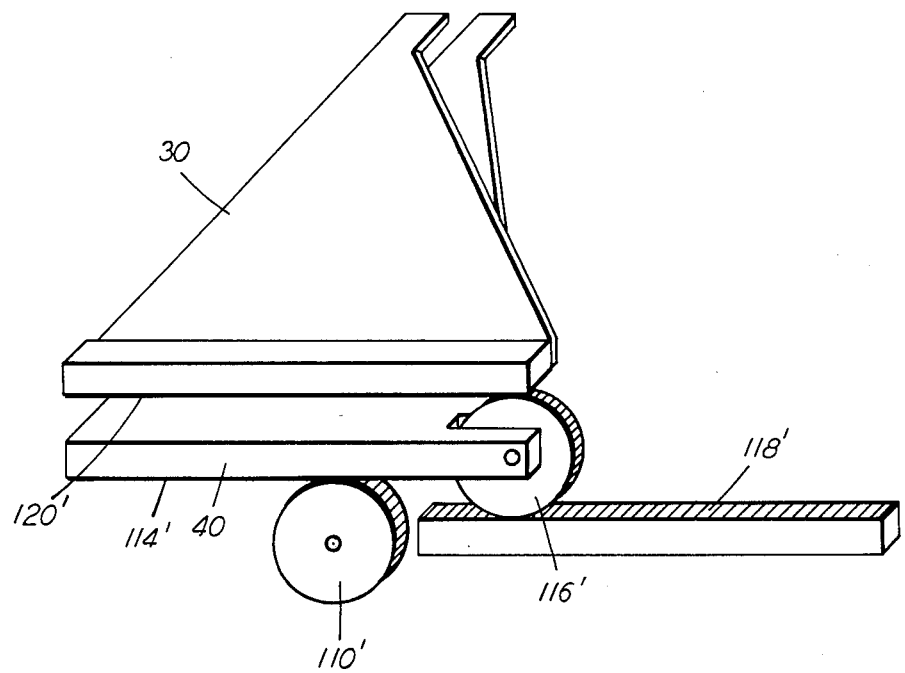
FIG. 5 shows an enlarged view of one side of the gear/rack arrangement of FIG. 4.

As illustrated in FIGS. 1, 2 and 3, two mechanical drive arrangements according to the invention provide for the scan and rescan motions of carriages 30 and 40. These motions are derived from the rotating xerographic drum 6 via drive pulley 20 fixedly mounted to shaft 19. The motion of pulley 20 is translated to a first drive shaft 54 via belt 56 and pulley 58, rotating shaft 54 in the indicated direction. Mounted upon first drive shaft 54 is scan drive gear 60 and scan drive pulley 62. As will be described below, drive gear 60 is adapted to impart a rescan velocity to carriages 30 and 40 via a drive mechanism generally identified as 70. Driver pulley 62 is adapted to provide a scan velocity to the carriage via portions to drive mechanism 70.

Referring now to drive mechanism 70, shown in a side perspective view in FIG. 2, and from a top perspective in FIG. 3, the movement of scan carriages 30, 40 is derived from the motion of a second drive shaft 72 whose rotational direction is determined by the arrangement of mechanical elements mounted thereon and their operative connection to gear 60 or pulley 62.

Mounted on shaft 72 is a clutch hub 74. Hub 74, comprising a first segment 74a, a second segment 74b and a splined segment 74c, is connected to shaft 72 so that it can slide in the indicated +X, −X direction, but cannot rotate relative to sahft 72. Pulley 76, driven by drive pulley 62 via belt 78, is free to rotate on shaft 72 via bearings 80. Gear 82, driven by gear 60, is also free to rotate on shaft 72 via bearings 83. The movement of hub 74 in the +X, −X direction is limited by retaining rings 84, 86, respectively.

Hub 74a and 74b present frictional surfaces to the interfacing surface of pulley 76 and gear 82, respectively. When either hub becomes frictionally engaged, a torque is transmitted from the engaged drive component pulley 76 or gear 82 to clutch hub 74 and, hence, to shaft 72.

The angular velocity and rotational direction of shaft 72 is therefore, controlled by whichever of the two drive components has been frictionally engaged. At either end of shaft 72 is a scan carriage drive pulley 90, 90′, each pulley driving a belt 92, 92′ to which the full rate carriage 30 is attached. Pulley pairs 94, 94′ divide the speed in half to drive the half rate carriage 40. Pulleys 96, 96′ are for tensioning/idler purposes.

The mechanism for controlling the X direction movement of hub segments 74a, 74b and hence, the rotation and speed of shaft 72, is generally shown as toggle mechanism 100 in FIG. 3. Mechanism 100 comprises a first link 102 with projecting ends 102a, 102b which rotate about pivot point 104. Link 102 is connected to a second link 106 and provides a horizontal motion to that link. Link 106 is connected to a third link 108 which rotates about pivot point 110. The motion of link 108 is limited by stops 112, 112′. Toggle spring 114 is connected to link 108 and a fourth link 116 which rotates about pivot point 118. When link 116 rotates clockwise, it will bias hub 74 in the −X direction, engaging gear 82. When link 116 rotates counter-clockwise, it will bias hub 74 in the +X direction, engaging pulley 76. The operation of mechanism 100 can best be understood by reviewing a scan/rescan cycle of operation of the scan carriage. Referring to FIG. 2 and 3, hub segment 74b is shown in frictional engagement with drive pulley 76. Drive gear 82, not being frictionally engaged, slips on bearings 83. Drive shaft 72, and carriage pulleys 90, 90′ drive belt 92 and attached carriage 30 at a scanning speed $V_m$ determined by the diameter ratio of pulleys 62, 67. Pulley pairs 94, 94′ divide the speed in half to drive attached carriage 40 at a speed $V_m/\alpha$. Carriage 30 is therefore moving in the scan direction from left to right in FIG. 1 or in the +Y direction along slide 31 as shown in FIG. 3. Carriage 30 has end ramp member 120 which has an inboard edge 120a protruding beyond the diameter of the guide rail. As carriage 30 proceeds in the +Y direction, corner 120a, at a predetermined end of scan position, contacts corner 102a of link 102, causing link 102 to rotate counter-clockwise on pivot point 104. Link 106 is urged toward the right, causing link 108 to rotate clockwise. When link 108 trips over center, the toggle action of spring 114 causes link 116 to rotate clockwise, moving the clutch hub 74 in the −X position. This causes hub segment 74b to disengage from pulley 76 and hub segment 74a to frictionally engage gear 82. Gear 82 then assumes the role of driving shaft 72, reversing the direction and speed of shaft 72. Pulley pair 90, 90′ is now rotated in a rescan direction at a speed determined by the rotational velocity of gear 60. Carriages 30, 40 are moved from right to left in FIG. 1 and in the −Y direction in FIGS. 2 and 3. Rescan motion continues until carriage 30 edge 120a contacts link corner 102b, which has been rotated into the contacting path from the previous movement. Contact with edge 102a causes link 102 to rotate clockwise, moving link 106 to the left. Link 108 is moved counter-clockwise and spring 114 causes link 116 to rotate counter-clockwise, moving clutch hub 74 in the +X direction. This causes hub segment 74a to disengage from gear 82 and to again frictionally engage pulley 76, initiating the scan cycle once again.

Figure 7:
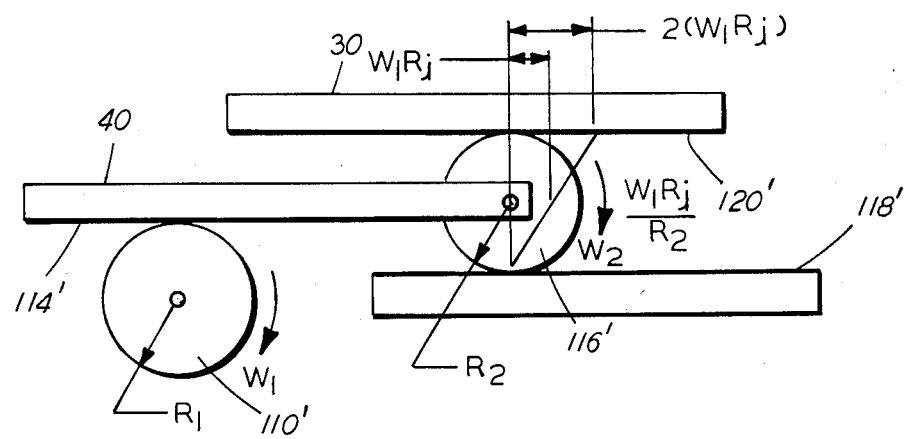
FIG. 7 is a side view of the gear/rack arrangement of FIG. 5 illustrating the angular velocity and radius relationship of the driving gears.

While the drive mechanism embodiment of FIGS. 1-3 describes a pulley/gear arrangement for driving carriages 30 and 40, another mechanical drive arrangement can be used to accomplish the same result. Referring to FIGS. 4 through 7, there is shown the same basic system as described in FIGS. 2, 3, except for the substitution of input gears 110, 110' for pulleys 90, 90' and a rack/multiplier gear system generally shown as 112, 112' which replaces the pulley cable arrangement 92, 94, 96. As shown, input gears 110, 110' are fixedly attached to the ends of shaft 72 and rotate therewith at a scan or rescan speed determined by the engagement of either pulley 75 or gear 82, as previously described. Gears 110, 110' mesh with rack surfaces 114, 114' which have been formed on the underside of half rate carriage 40. As gears 110, 110' rotate at a velocity $w_1$, the half rate carriage 40 is driven at a velocity $w_1 r_1$ where $r_1$ is the pitch radius of input gears 110, 110'. Multiplier gears 116, 116' are rotatably connected to the ends of carriage 40. The angular velocity $w_2$ of gears 116, 116' is equal to $w_1 r_1 / r_2$ where $r_2$ is the pitch radius of gears 116, 116'. Gears 116, 116' travel on fixed racks 118, 118' and rack surfaces 120, 120' formed along the bottom edge surfaces of full rate carriage 30. Multiplier gears 116, 116' will therefore drive carriage 30 at a speed of $\alpha$ ($w_1 r_1$) or twice the half rate speed. FIG. 7 shows the rotational velocity and radius relationship for gears 110 and 116.

As in the initially-described pulley operation of FIGS. 2, 3, the edge 120a of carriage 30 engages the corners of link 102 to reverse the direction and speed of shaft 72 so as to enable the scan and rescan operation.

From the above description, it will be appreciated that there has been described a simple, wholly mechanical, drive system for driving a document scanning mechanism. The absence of electrical components such as the usual clutches and switches to initiate scan and rescan motions reduces the cost and complexity of the scanning system with single scan carriage. It should also be noted that the mechanism shown in FIG. 6 can constitute an alternate embodiment to the two-sided drive of FIG. 5. And while specific scanning systems have been described, various modifications of these systems are possible, consistent with the principles of the present invention. For example, while a dual rate scanning system has been shown, the invention is applicable to a single rate scan system. And while separate scan and rescan velocities have been described, both velocities can be made equal by appropriate modification to the drive pulley/gear ratios shown in FIG. 2. All such modifications are intended to be included in the following claims.

What is claimed is:

1. A scanning apparatus for reproducing a stationary original document supported on an object surface, the apparatus including optical means for progressively scanning the surface of the original and a lens for receiving the image from said scanning means and for projecting the scanned image onto a moving photosensitive member, the improvement wherein said optical means comprises at least one scanning assembly, adapted to travel along a scan and rescan path parallel to said object surface;

a drive shaft adapted to be driven at a constant velocity by the motion of said photosensitive member, a scanning assembly drive mechanism mechanically coupled to said drive shaft, and to said scanning assembly, said drive mechanism adapted to alternately drive said scanning assembly at a first scan velocity v and a second rescan velocity v'; and a scanning assembly reversal mechanism operatively positioned between said scanning assembly and said drive mechanism, said reversal mechanism adapted to be periodically engaged by the movement of said scanning assembly, such engagement changing the operation of said drive mechanism so as to reverse the direction of travel of said scanning assembly.

2. The scanning apparatus of claim 1 wherein said scanning assembly drive mechanism includes a cable and pulley arrangement.

3. The scanning apparatus of claim 1 wherein said scanning assembly drive mechanism includes a rack and gear arrangement.

4. The scanning apparatus of claim 1 wherein said reversal mechanism includes a toggle link means to effect said periodic reversal.

5. The scanning assembly of claim 1 wherein said scanning assembly drive mechanism includes a second drive shaft having fixedly mounted thereon a gear and a pulley and a third drive shaft having mounted at the ends thereof, fixed drive mechanism operatively engaged with said scanning assembly, and having centrally mounted drive components which cooperate with said gear and pulley to periodically change the rotational direction of said fixed drive mechanism.

* * * * *